United States Patent
Kuo et al.

(10) Patent No.: US 8,511,897 B2
(45) Date of Patent: Aug. 20, 2013

(54) LINEAR MOTION TRANSMISSION APPARATUS WITH A CHAIN

(75) Inventors: Chang-Hsin Kuo, Taichung (TW); Tsung-Jen Chen, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 520 days.

(21) Appl. No.: 12/832,228

(22) Filed: Jul. 8, 2010

(65) Prior Publication Data

US 2012/0006136 A1    Jan. 12, 2012

(51) Int. Cl.
*F16C 29/06*    (2006.01)
*F16C 29/04*    (2006.01)

(52) U.S. Cl.
USPC ............................................. 384/45; 384/49

(58) Field of Classification Search
USPC ........................ 384/43–45, 49–51
See application file for complete search history.

(56) References Cited

U.S. PATENT DOCUMENTS

| | | | | |
|---|---|---|---|---|
| 4,844,628 | A * | 7/1989 | Knappe | 384/510 |
| 6,364,086 | B1 * | 4/2002 | Blaurock et al. | 193/35 MD |
| 7,419,302 | B2 * | 9/2008 | Matsumoto | 384/45 |
| 7,806,017 | B2 * | 10/2010 | Osterlaenger et al. | 384/43 |
| 8,100,025 | B2 * | 1/2012 | Lin | 384/37 |

* cited by examiner

*Primary Examiner* — James Pilkington
(74) *Attorney, Agent, or Firm* — Banger Shia

(57) ABSTRACT

A linear motion transmission apparatus with a chain comprises at least one flexible link and a plurality of spacers, the spacers are equidistantly spaced apart and connected by the link, each two neighboring spacers define a holding space for holding rolling elements, each of the spacers has two separated arcuate retaining portions used to contact and hold the rolling elements. A lubricating-oil passage is formed between each of the spacers and the rolling elements to guide the lubricating oil from the non-load area of the outer surface of the rolling element to the load area, allowing the load area to be lubricated sufficiently.

5 Claims, 11 Drawing Sheets

LINEAR MOTION TRANSMISSION APPARATUS WITH A CHAIN

BACKGROUND OF THE INVENTION

1. Field of the Invention

The present invention relates to a linear motion transmission apparatus and its chain.

2. Description of the Prior Art

Referring to FIGS. 1 and 1A, a conventional chain structure for a motion transmission apparatus comprises includes a plurality of spacers 511 and two links 512 at both sides of the respective spacers 511 for connecting them together so that a plurality of rolling elements 513 roll within the spaces defined by the spacers 511 and the links 512. If this conventional chain structure is an assembly structure, it will cost a lot of time and manpower to assemble spacers 511 and the links 512 together into a chain structure. If the spacers 511 are unitary with the links 512, the spacers 511 are concave structures from the point of view of mold design, which will lead to the occurrence of undercut during demolding. Using rolling elements as a mold core to produce the chain has the disadvantages of low production efficiency and that the oil on the outer surface of the rolling elements can easily be scrapped off.

Referring to FIG. 2, another conventional chain structure 61 for holding the rolling element 513 comprises a plurality of spacers 611 and two links 612 connected at both sides of the spacers 611. The disadvantage of this conventional chain structure is that, during injection molding, a thin and long cylindrical member must be used as a core in order to form the circular aperture 613 in the respective spacers 611, and after forming of the product, it has to use a complicated transmission mechanism to push or pull out the cylindrical member. However, the formed product will tightly embrace the cylindrical member after cooling off, making it difficult to pull out the cylindrical member. Meanwhile, the pulling action might cause burrs on the formed product. Furthermore, the rolling element 513 is in linear contact with the inner diameter of the circular aperture 613, the contact area is a closed space, and the linear contact has a relatively large contact pressure which makes it difficult for the oil film to pass through the contact surface, and as a result, the lubricant oil is more likely to be scraped off.

When the rolling element 513 rolls along the rolling path (not shown), the contact area of the rolling element 513 with respect to the rolling path is defined as a load area which is approximately annular (as indicated by the slanting lines on the outer surface of the rolling element in FIGS. 1 and 2). Since the load area 111 keeps contacting the rolling path, the lubricating oil thereof will continuously be pushed to the areas at both sides of the load area 111, as a result, the areas at both sides of the load area 111 are covered with lubricating oil, but the annular load area 111 that needs to be lubricated is not sufficiently lubricated.

The present invention has arisen to mitigate and/or obviate the afore-described disadvantages.

SUMMARY OF THE INVENTION

The primary object of the present invention is to provide a linear motion transmission apparatus with a chain which is injection molded by an upper mold and lower molds and suitable for mass production, and the mold design and manufacturing cost is reduced.

Another object of the present invention is to solve the problem that the conventional chain is likely to scrap away the lubricating oil in the load area of the rolling elements.

To achieve the above objects, a linear motion transmission apparatus in accordance with the present invention comprises: an elongated shaft, a slide block slidably, a plurality of rolling elements, and a chain.

The elongated shaft is provided on its outer surface with a rolling groove.

The slide block is slidably mounted on the elongated shaft and formed with a rolling groove for cooperating with the rolling groove of the elongated shaft to form a load path; both ends of the load path are connected to both ends of a return path to form an endless circulation path.

The plurality of rolling elements are movably received in the endless circulation path to enable the slide block to slide along the elongated shaft, the rolling elements don't contact the rolling groove of the elongated shaft and the rolling groove of the slide block when within the return path, and when in the load path, the rolling elements are in contact with the rolling groove of the elongated shaft and the rolling groove of the slide block to take load, when the rolling elements roll between the rolling groove of the elongated shaft and the rolling groove of the slide block, a rolling contact track which is formed on each of the rolling elements when the rolling elements are rolling with respect to the rolling grooves is annular-shaped and defined as a load area.

The chain is received in the endless circulation path and comprises two flexible links and a plurality of spacers, the spacers are equidistantly spaced apart and connected by the links, each two neighboring spacers defines a holding space for holding the rolling elements, each of the spacers includes two arcuate retaining portions which are arranged in a staggered manner and a connecting portion connected between the retaining portions, the connecting portion is sheet shaped and flexible to provide flexibility between the arcuate retaining portions, the connecting portion is thinner than the two arcuate retaining portions.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Referring to FIGS. 3-9, a linear motion transmission apparatus with a chain in accordance with a preferred embodiment of the present invention comprises: an elongated shaft 1, a slide block 2, a plurality of rolling elements 5, and a chain 4.

Figure 1A:
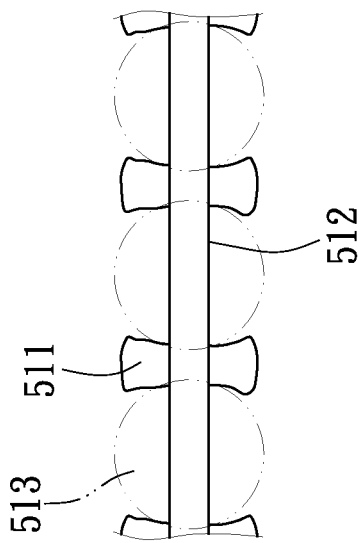
FIG. 1A is a side view of the conventional chain for a linear transmission apparatus.
Figure 1:
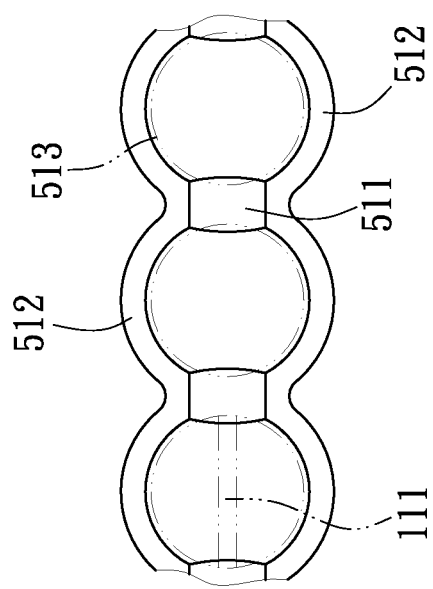
FIG. 1 is a top view of a conventional chain for a linear transmission apparatus.
Figure 2:
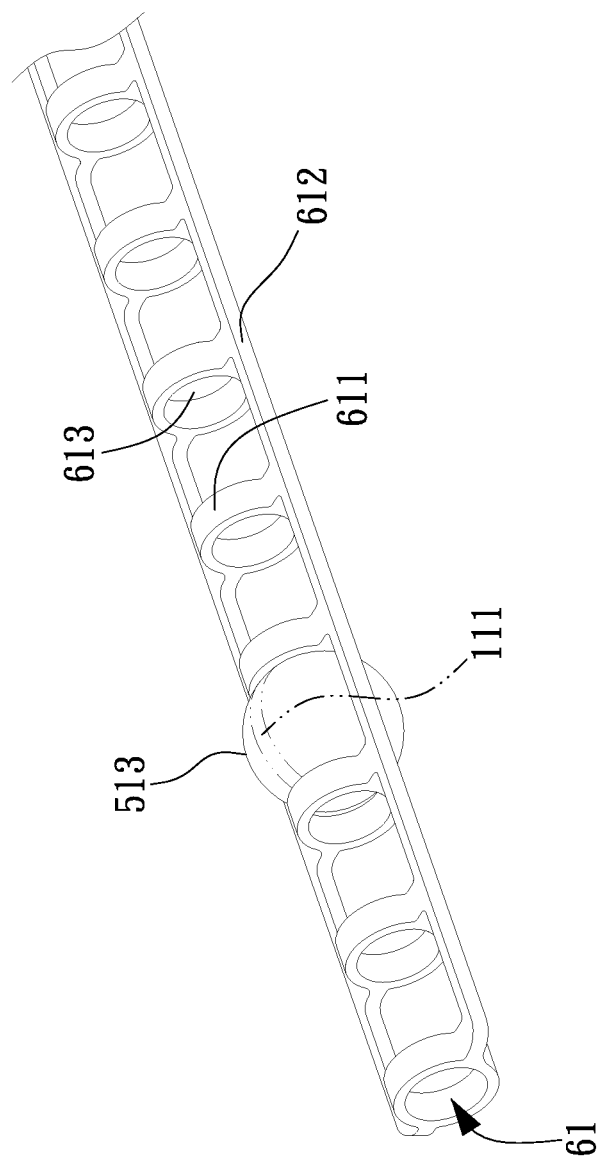
FIG. 2 is a perspective view of another conventional chain for a linear transmission apparatus.
Figure 3:
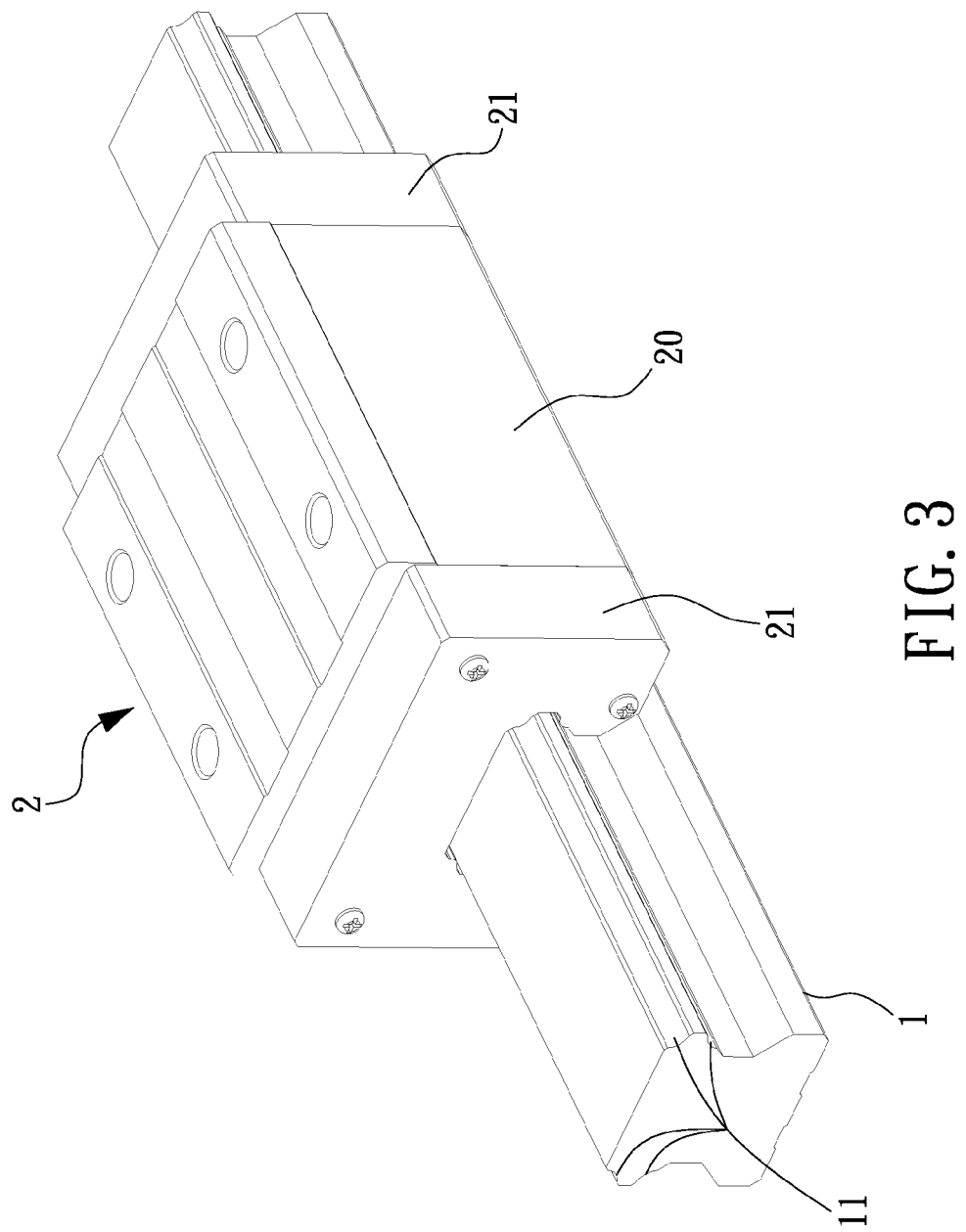
FIG. 3 is a perspective view of a linear transmission apparatus with a chain in accordance with the present invention.

The elongated shaft 1 is provided on its outer surface with a rolling groove 11 which has a cross section corresponding to the shape of the rolling elements 5. The elongated shaft 1 in FIG. 3 is a linear rail and has a rectangular cross section, and the rolling groove 11 is straight.

Figure 4:
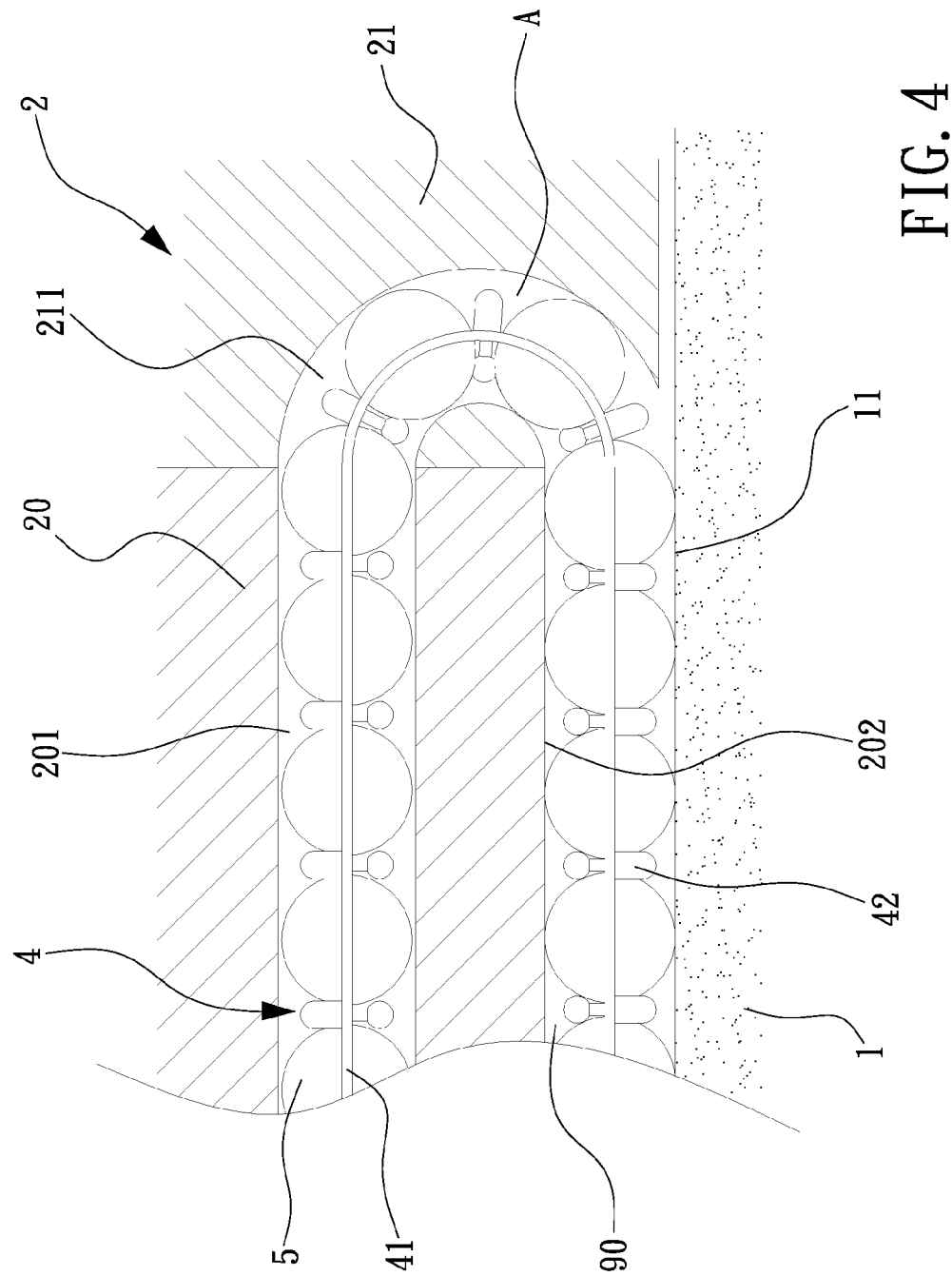
FIG. 4 is an illustrative view of the linear transmission apparatus with the present invention, showing that the chain is sliding within the circulation path.

The slide block 2 is slidably mounted on the elongated shaft 1 and includes a slide body 20 and a two circulating members 21 at both ends of the slide body 20. The slide block 2 is formed with a rolling groove 202 for cooperating with the rolling groove 11 of the elongated shaft 1 to form a load path 90 (as shown in FIG. 4). Within the load path 90, the rolling elements 5 receive the load from the rolling grooves 11 and 202, and the slide block 2 is capable of reciprocating along the elongated shaft 1. When the slide block 2 is subjected to an external force, the rolling elements 5 are inserted between the slide block 2 and the elongated shaft 1 to provide a reactive force for the slide block 2 and the elongated shaft 1 to counteract the external force. The slide block 2 is further axially formed with circulating holes 201 penetrating to both end surfaces thereof for passage of the rolling elements 5. As shown in FIG. 3, the rolling groove 202 is straight.

The circulating members 21 are attached to both ends of the slide body 20 and move together with the slide body 20. Each of the circulating members 21 is formed with a return groove 211 which is connected between the circulating holes 201 and the load path 90 to form an endless circulation path. The return grooves 211 of the circulating members 21 and the circulating holes 201 are connected together to form a return path A. The return path A of some other linear motion transmission apparatus is a unitary structure and cannot be divided into circulating holes 201 and return grooves 211, so whether the slide block 2 is provided with the circulating holes 201 or not is not a necessary feature of the present invention. Both ends of the load path 90 are connected to both ends of the return path A to form the endless circulation path along which the rolling elements 5 roll endlessly.

Figure 6:
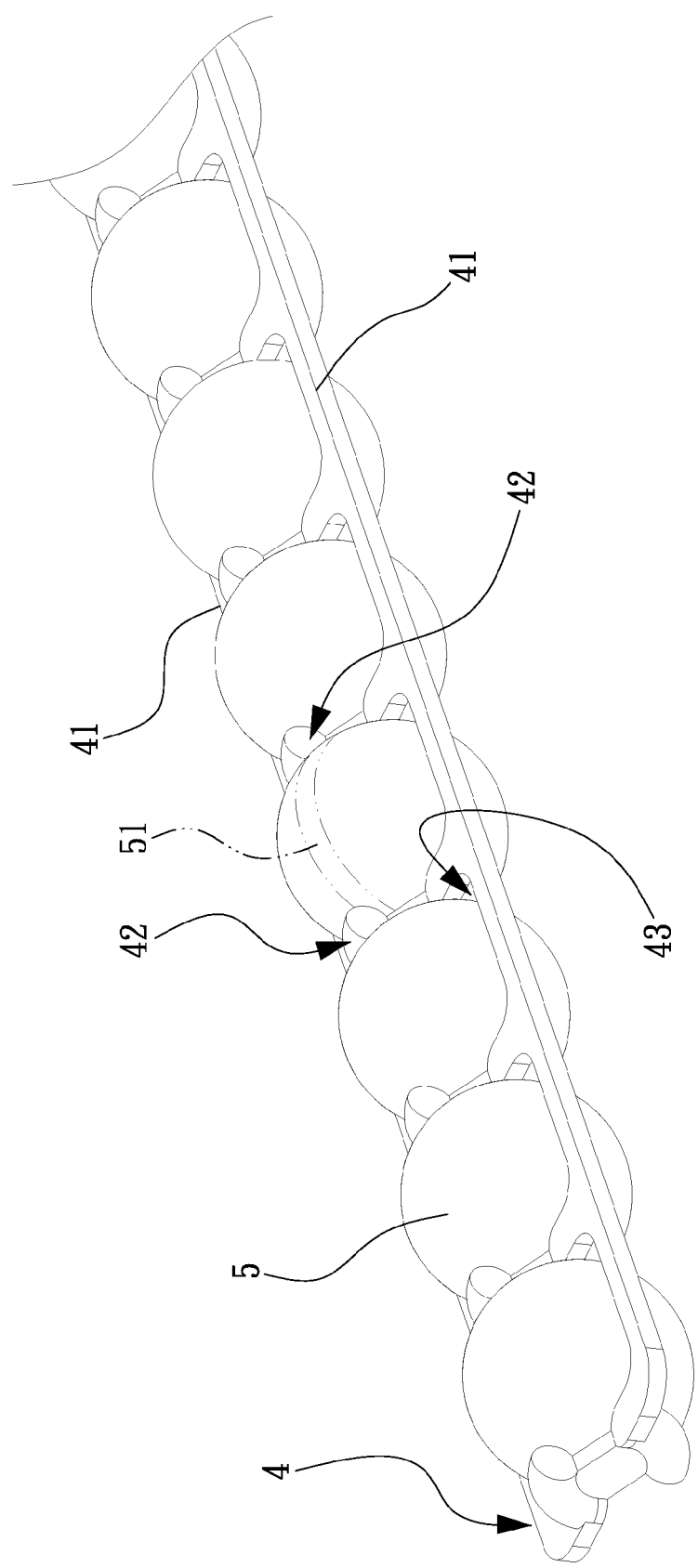
FIG. 6 is a perspective view of the chain for a linear transmission apparatus in accordance with the present invention, wherein the chain is filled with rolling elements.
Figure 8:
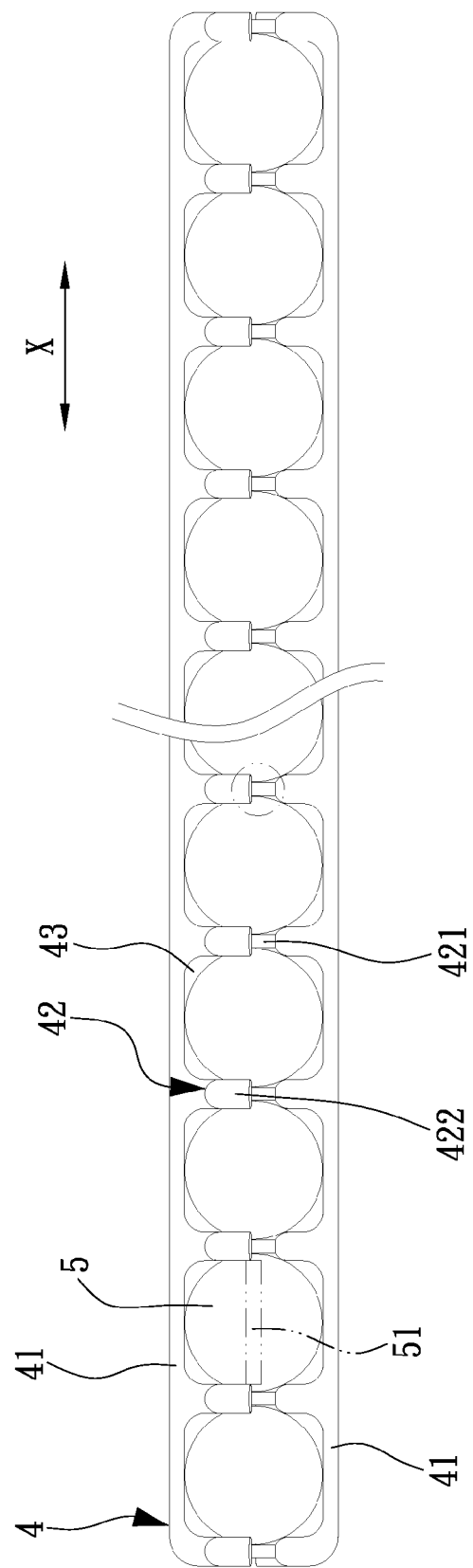
FIG. 8 is a top view of the chain for a linear transmission apparatus in accordance with the present invention, wherein the chain is filled with rolling elements.
Figure 9:
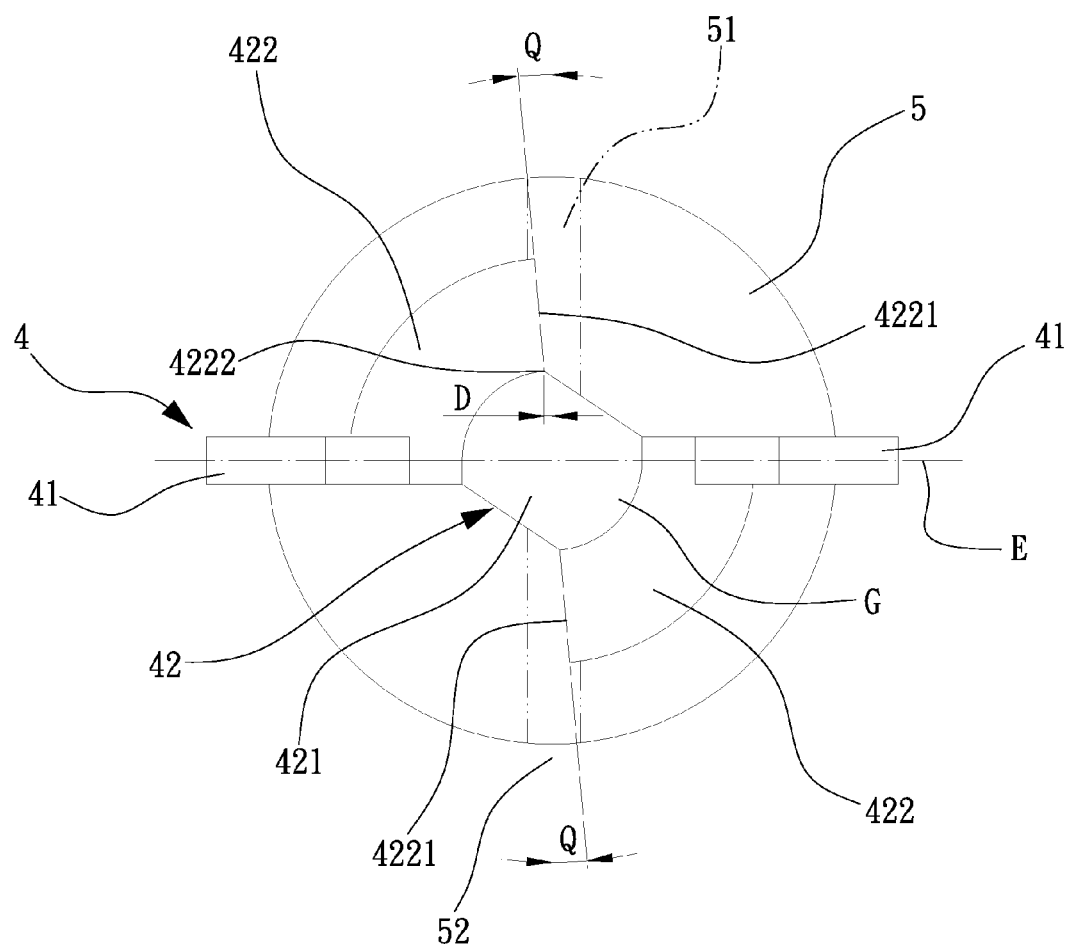
FIG. 9 is a cross sectional view of the chain for a linear transmission apparatus in accordance with the present invention.

The rolling elements 5 are movably received in the endless circulation path to make the slide block 2 slide along the elongated shaft 1. When rolling in the return path A, the rolling elements 5 don't contact the rolling grooves 11 and 202, and when in the load path 90, the rolling elements 5 are in contact with the rolling grooves 11 and 202 to take the load. Referring to FIGS. 6, 8 and 9, when the rolling elements 5 roll between the rolling grooves 11 and 202, the rolling contact track formed on each of the rolling elements 5 when the rolling elements 5 are rolling along the rolling grooves 11 and 202 is approximately annular-shaped and defined as load area 51.

Figure 5:
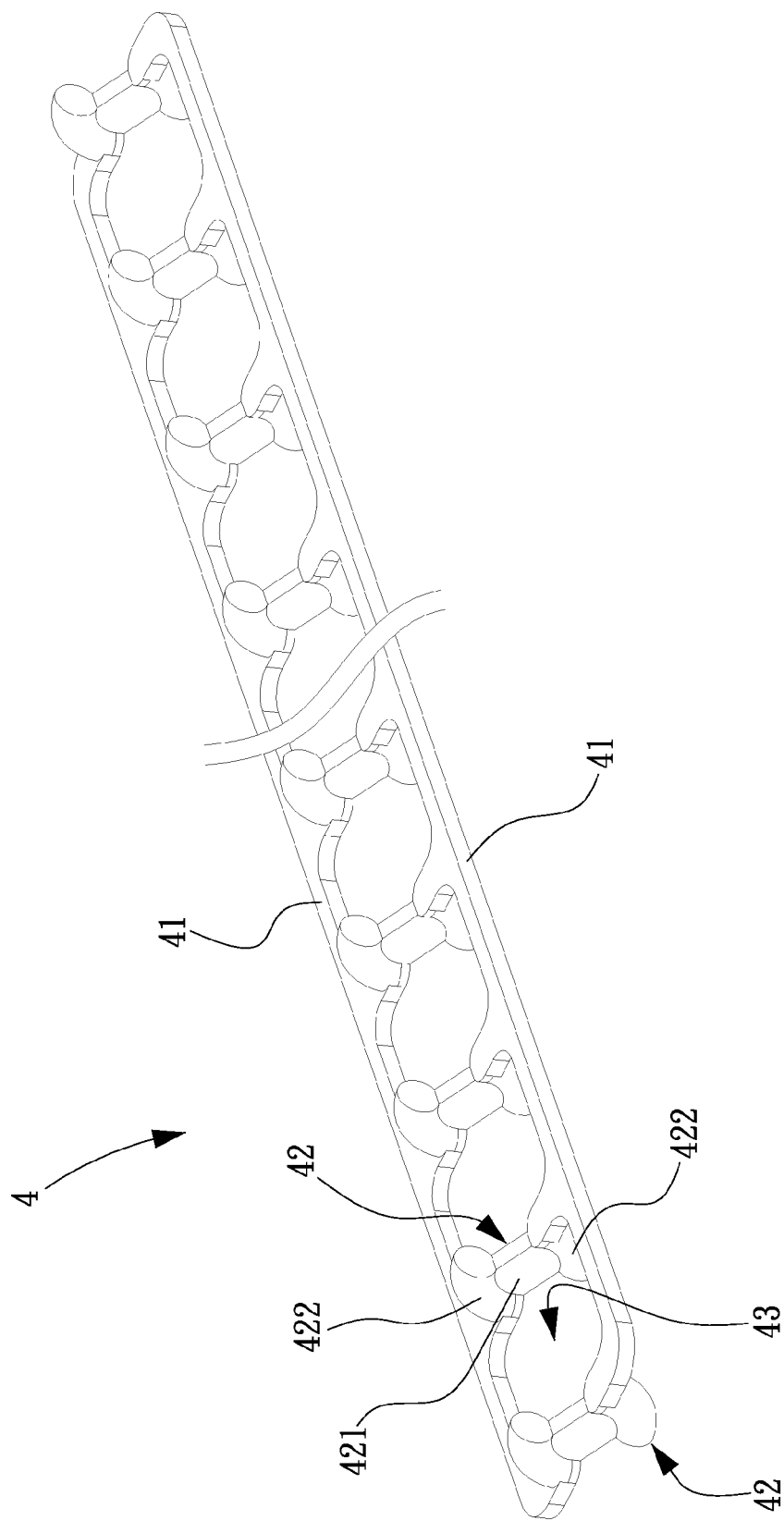
FIG. 5 is a perspective view of the chain for a linear transmission apparatus in accordance with the present invention.

The chain 4 is received in the endless circulation path and comprises at least one flexible link 41 and a plurality of spacers 42. The spacers 42 are equidistantly spaced apart and connected by the link 41. Each two neighboring spacers 42 define a holding space 43 for holding the rolling elements 5. In this embodiment, there are two links 41 symmetrically arranged at both sides of the respective spacers 42. As shown in FIG. 5, each of the spacers 42 includes two retaining portions 422 and a connecting portion 421 connected therebetween. Each retaining portion 422 has an arcuate contact area TO for contacting the rolling elements 5 and extends in an angle of approximately 90 degrees around the connecting portion 421. The connecting portion 421 is sheet shaped and thinner than the retaining portions 422, as shown in FIG. 5. The connecting portion 421 can be in the form of a wavy, circular or irregular sheet, in this embodiment, it is a circular sheet with both sides cut off (truncated). Since the connecting portion 421 connected between the two retaining portions 422 is sheet-shaped and flexible, which provides flexibility between the retaining portions 422.

Figure 7:
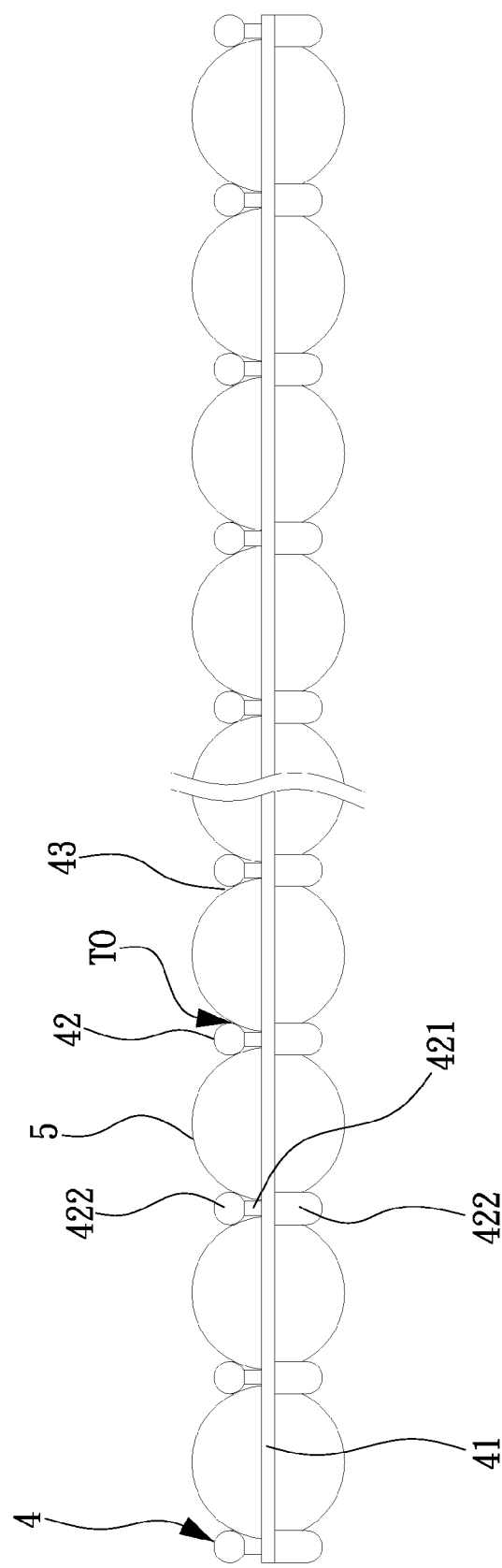
FIG. 7 is a side view of the chain for a linear transmission apparatus in accordance with the present invention, wherein the chain is filled with rolling elements.
Figure 10:
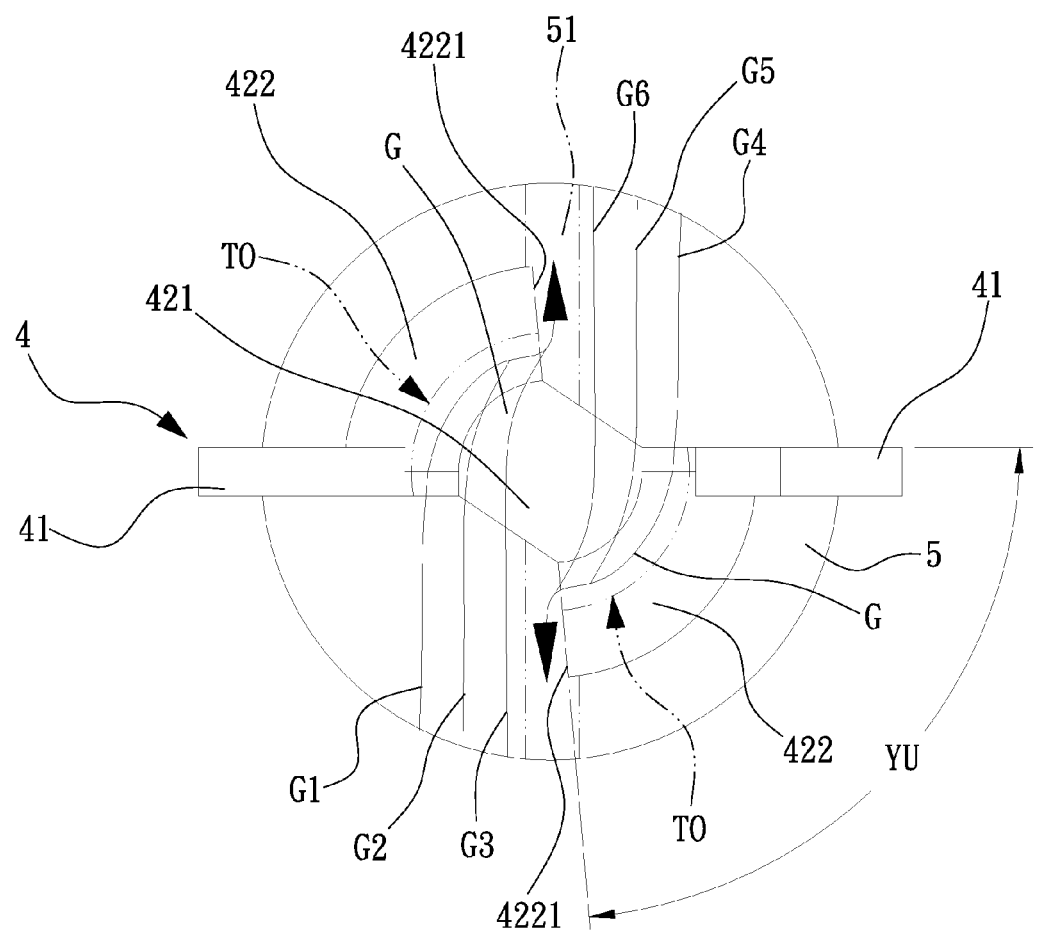
FIG. 10 is an illustrative view of the lubricating-oil passages of the linear transmission apparatus in accordance with the present invention.

Referring to FIGS. 7 and 10, there are two symmetrically arranged arcuate contact areas TO for each rolling members 5, since the sum of the angles at the circumferences of the two arcuate contact areas TO must be smaller than 360 degrees, each angle YU at the circumference of each arcuate contact area is less than 180 degrees and preferably equals to 90 degrees (namely, a quarter of a circle, as shown in FIG. 10), so that the contact area TO can guide the lubricating oil in the largest possible area, and the lubricating oil is guided to the load area 51 of the rolling elements 5. As shown in FIG. 7, the contact area TO of each of the rolling elements 5 contacting the rolling elements 5 is not concave, so that the outer surface of the retaining portions 422 is in point contact with the rolling elements 5. The rolling surface of each of the rolling elements 5 is curved, when the rolling element 5 slides (not rolls) between the retaining portions 422, the thickness of the oil film will reduce gradually, producing a hydrodynamic pressure for lubricating, so that when sliding friction is caused between the rolling element 5 and the retaining portions 422, a layer of oil film will still be maintained in the outer surface of the rolling element 5 without being scrapped off. To achieve such effect, the outer surface of the retaining portions 422 can be designed not to be concave or designed to have a radius of curvature larger than the rolling elements 5. The non-concave contact area of the retaining portions 422 is a convex curved surface or a flat surface. The closer the outer surface of the retaining portions 422 is located to the rolling element 5, the more precise the production control should be.

The lengthwise direction of the links 41 is defined as X direction (as shown in FIG. 8), a virtual connection between the two links 41 is defined as a guiding surface E (as shown in FIG. 9), and the central part of the outer surface of each of the rolling elements 5 is defined as a central surface 52 which passes through the center of each spacer 42 and vertical to the guiding surface E. In order to reduce the mold design and manufacturing cost, the forming of the chain 4 only requires the use of an upper mold and a lower mold which can be released from each other along the guiding surface E. The two retaining portions 422 of the respective spacers 42 are located at both sides of the central surface 52 of the rolling elements 5 and each are symmetrically arranged with respect to the guiding surface E. The two retaining portions 422 of the respective spacers 42 are arranged in a staggered manner (namely, arranged in the first and third quadrants, respectively, or in the second and fourth quadrants, respectively). To make it easier for the chain 4 to demold, an end surface 4221 of each of the retaining portions 422 is located at an angle Q with respect to the central surface 52 of the rolling elements 5 (the angle Q is optimally 1-7 degrees). As shown in FIG. 9, the angle Q extends from the guiding surface E to make it easy for the chain 4 to demold without interference, so that the chain 4 can be formed with a smooth surface and move more smoothly without causing interference within the endless circulation path.

Figure 8A:
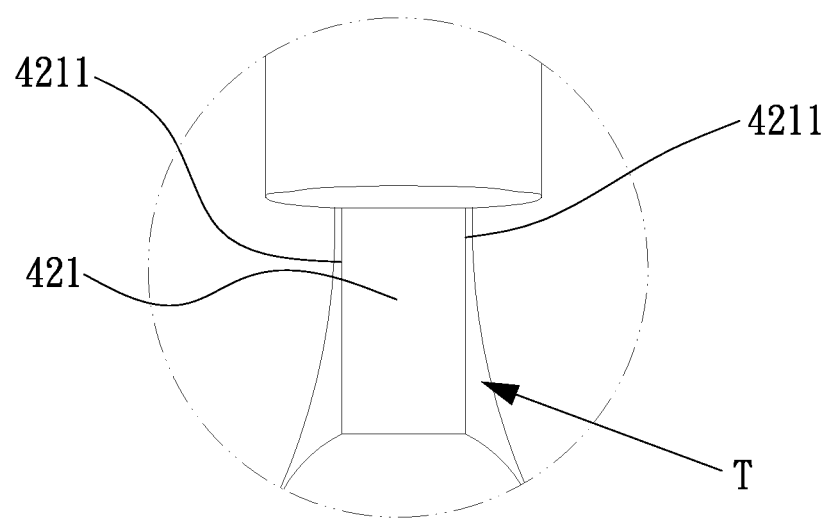
FIG. 8A is an enlarged view of the present invention showing a first interval is formed between the end surface of the connecting portion of the spacers in the X direction and a corresponding rolling element.

Referring to FIG. 8A, a first interval T is formed between the end surface 4211 of the connecting portion 421 of each of the spacers 42 in the X direction and a corresponding rolling element 5 to allow the lubricating oil to pass therethrough.

Referring to FIG. 10, the rolling elements 5 which is a ball each have an arcuate contact area TO for contacting each retaining portion 422, and on the outer surface of the rolling elements 5 adjacent to the arcuate contact area is formed a lubricating-oil passage G for allowing the lubricating oil to pass therethrough. When the rolling element 5 rotates horizontally about the horizontal line as shown in FIG. 10, the load area 51 on the outer surface of the rolling element 5 is annular shaped (as indicated by the slanting lines). When the rolling element 5 vertically rotates in a bottom-up direction, the lubricating oil on the outer surface of the rolling element 5 also moves in a bottom-up direction to form three lubricating-oil passages G1-G3. When the lubricating oil on the outer surface of the rolling element 5 moves upward and approaches the upper annular contact area TO, the lubricating-oil passages G1-G3 will shift rightward (will be connected) to the load area 51 on the outer surface of the rolling element 5, so that the lubricating-oil passages G1-G3 can guide the lubricating oil from the non-load area (left) of the outer surface of the rolling element 5 to the load area 51, allowing the load area 51 to be lubricated sufficiently. When the rolling element 5 vertically rotates in a top-down direction, the lubricating oil on the outer surface of the rolling element 5 also moves in a top-down direction to form three lubricating-oil passages G4-G6. After the lubricating oil on the outer surface of the rolling element 5 moves downward and approaches the lower annular contact area TO, the lubricating-oil passages G4-G6 will shift leftward to (will be connected to) the load area 51 on the outer surface of the rolling element 5, so that the lubricating-oil passages G4-G6 can guide the lubricating oil in the non-load area (right) of the outer surface of the rolling element 5 to the load area 51, allowing the load area 51 to be sufficiently lubricated. No matter the rolling element 5 rotates clockwise or counterclockwise, the load area 51 on the outer surface of the rolling element 5 can be efficiently lubricated. The lubricating-oil passage G includes the passages G1-G6. The arrows in FIG. 10 indicate the flowing direction of the lubricating-oil passage G, and all the lubricating-oil passages are C-shaped and pass through the load area 51 (as indicated by the slanting lines) of the rolling element 5. When the load area 51 rotates in the holding space 43, the lubricating-oil passage G can supply sufficient lubricating oil to lubricate the load area 51. The two retaining portions 422 of each spacer 42 are located at both sides of the load area 51 of the rolling element 5, so that there are lubricating-oil passages G at both sides of the load area 51 of the rolling element 5 to guide the lubricating oil at both sides thereof.

Between a point of intersection 4222 of the end surface 4221 and the connecting portion 421 of each of the retaining portions 422 and the central surface 52 of the rolling element 5 is formed a second interval D which broadens the lubricating-oil passage G.

While we have shown and described various embodiments in accordance with the present invention, it is clear to those skilled in the art that further embodiments may be made without departing from the scope of the present invention.

What is claimed is:

1. A linear motion transmission apparatus comprising:
an elongated shaft provided on its outer surface with a rolling groove;
a slide block slidably mounted on the elongated shaft and formed with a rolling groove for cooperating with the rolling groove of the elongated shaft to form a load path, both ends of the load path are connected to both ends of a return path to form an endless circulation path;
a plurality of rolling elements movably received in the endless circulation path to enable the slide block to slide along the elongated shaft; and
a chain received in the endless circulation path and comprising two flexible links and a plurality of spacers, the spacers being equidistantly spaced apart and connected by the two flexible links, each two neighboring spacers defining a holding space for holding the rolling elements, the chain being characterized in that each of the spacers includes two arcuate retaining portions which are arranged in a staggered manner and a connecting portion connected between the retaining portions, the connecting portion is sheet shaped and flexible to provide flexibility between the arcuate retaining portions, the connecting portion is thinner than the two arcuate retaining portions.

2. The linear motion transmission apparatus as claimed in claim 1, wherein each of the arcuate retaining portions extends in an angle of approximately 90 degrees around the connecting portion.

3. The linear motion transmission apparatus as claimed in claim 1, wherein each of the two arcuate retaining portions includes an arcuate contact area for contacting the rolling elements.

4. The linear motion transmission apparatus as claimed in claim 3, wherein a first interval is formed between an end surface of the connecting portion of each of the spacers in a lengthwise direction of the two flexible links and a corresponding rolling element.

5. The linear motion transmission apparatus as claimed in claim 3, wherein the arcuate contact areas are convex, so that an outer surface of the retaining portions is not in a full surface-to-surface contact with the rolling elements.

* * * * *